(12) United States Patent
Fu

(10) Patent No.: US 8,432,806 B2
(45) Date of Patent: Apr. 30, 2013

(54) DATA TRANSMISSION CONTROL METHOD AND DATA TRANSMISSION DEVICE

(75) Inventor: Saixiang Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 506 days.

(21) Appl. No.: 12/649,616

(22) Filed: Dec. 30, 2009

(65) Prior Publication Data

US 2010/0103880 A1   Apr. 29, 2010

Related U.S. Application Data

(63) Continuation of application No. PCT/CN2008/072143, filed on Aug. 26, 2008.

(30) Foreign Application Priority Data

Aug. 26, 2007   (CN) .......................... 2007 1 0045338

(51) Int. Cl.
*G01R 31/08* (2006.01)
*H04B 7/00* (2006.01)
*H04W 4/00* (2009.01)
*H04L 12/28* (2006.01)

(52) U.S. Cl.
USPC ............ 370/235; 370/310; 370/328; 370/392

(58) Field of Classification Search .......... 370/235–237; 709/238–232
See application file for complete search history.

(56) References Cited

U.S. PATENT DOCUMENTS

| | | | |
|---|---|---|---|
| 2003/0179720 | A1 | 9/2003 | Cuny |
| 2004/0003105 | A1 | 1/2004 | Berzosa et al. |
| 2004/0095935 | A1* | 5/2004 | Connor .......................... 370/392 |
| 2004/0174816 | A1* | 9/2004 | Stewart et al. ................ 370/235 |
| 2004/0215753 | A1 | 10/2004 | Chan et al. |
| 2004/0264370 | A1 | 12/2004 | Moon et al. |
| 2005/0144303 | A1* | 6/2005 | Zhang et al. ................... 709/231 |
| 2006/0136598 | A1* | 6/2006 | Fischofer ....................... 709/238 |
| 2007/0260745 | A1* | 11/2007 | Moutarlier .................... 709/237 |

(Continued)

FOREIGN PATENT DOCUMENTS

| | | |
|---|---|---|
| CN | 1267419 A | 9/2000 |
| CN | 1271221 A | 10/2000 |

(Continued)

OTHER PUBLICATIONS

Jin, K., et al., "Spack: Rapid Recovery of the TCP Performance Using Split-Ack in Mobile Communication Environments," 1999 IEEE TENCON, pp. 761-764.

(Continued)

*Primary Examiner* — Brandon Renner

(57) ABSTRACT

The embodiments relate to the wireless communication field, and a data transmission control method and a data transmission device are provided. The method includes: receiving from a sender and buffering data in a buffer, and then forwarding the buffered data to a receiver; receiving an acknowledgement (ACK) returned by the receiver, where the ACK indicates that the data is received; adding or reducing the ACK returned by the receiver according to a volume of data unsent in the buffer; and sending the processed ACK to the sender. The data sending rate of the sender is controlled by the processed ACK. This makes the data transmission be reliable and highly efficient.

9 Claims, 3 Drawing Sheets

U.S. PATENT DOCUMENTS

| | | | |
|---|---|---|---|
| 2007/0286070 A1 | 12/2007 | Schliwa-Bertling et al. | |
| 2009/0154356 A1* | 6/2009 | Wiemann et al. | 370/236 |
| 2010/0103880 A1 | 4/2010 | Fu | |

FOREIGN PATENT DOCUMENTS

| | | | |
|---|---|---|---|
| CN | 1469601 A | | 4/2004 |
| CN | 1910868 A | | 2/2007 |
| CN | 101114999 A | | 1/2008 |
| WO | WO 99/04536 | | 1/1999 |
| WO | WO 99/53716 | | 10/1999 |
| WO | WO 2004/057817 A2 | | 7/2004 |
| WO | WO 2005/013083 A2 | | 2/2005 |

OTHER PUBLICATIONS

European Office Action, European Application No. 08 800 678.8-2416, Applicant: Huawei Technologies Co., Ltd., Dated: Jul. 8, 2011, 13 pages.

Border, J., et al. "Performance Enhancing Proxies Intended to Mitigate Link-Related Degradations," XP-002960550, Jan. 28, 2003, 39 pages, The Internet Society.

Zhu, J., et al. "Enhancing TCP Splitting in Satellite-Terrestrial Netwoks via ACK Reservation," GLOBECOM 2003, pp. 3264-3268, IEEE.

Written Opinion of the International Searching Authority, International Application No. PCT/CN2008/072143, Applicant: Shanghai Huawei Technologies Co., Ltd., et al. Dated: Dec. 4, 2008, 5 pages.

Chinese Office Action, Chinese Application No. 200710045338.9, Applicant: Huawei Technologies Co., Ltd., Dated: Apr. 17, 2009, 17 pages.

Extended European Search Report, European Application No. 08800678.8-2416 / 2154857, PCT/CN2008072143, Applicant: Huawei Technologies Co., Ltd., Dated: Mar. 10, 2011, 10 pages.

* cited by examiner

DATA TRANSMISSION CONTROL METHOD AND DATA TRANSMISSION DEVICE

CROSS-REFERENCE TO RELATED APPLICATIONS

This application is a continuation of International Application No. PCT/CN2008/072143, filed on Aug. 26, 2008, which claims priority to Chinese Patent Application No. 200710045338.9, filed on Aug. 26, 2007, both of which are hereby incorporated by reference in their entireties.

FIELD OF THE TECHNOLOGY

The present invention relates to the field of wireless communication, and more particularly to a data transmission control technique.

BACKGROUND OF THE INVENTION

Transmission Control Protocol (TCP) is one of the most basic communication protocols used in the Internet and on other interconnection networks and nowadays has become an actual standard for network communication. The TCP is mainly adapted to provide inter-process communication mechanisms and ensure the reliability of data transmission. The reliability includes acknowledging the reception of information data packets, marking sequence information of packets, and ensuring integrity of the packets, as well as controlling the errors, for example, rules for dealing with the problems that no acknowledgement information is received, the packets do not arrive in sequence, and the packets get dropped or are sent in incorrect order.

According to the analysis of the TCP, a sending window controls whether a TCP sender is able to send new data packet and the number of data packets that can be sent, where the sending window is also referred to as a congestion window (cwnd). Change of the sending window is mainly associated with an acknowledgement (ACK) signaling received by a sender. The TCP sender controls the moving rightwards of the window according to a sequence number of a TCP packet carried in the received ACK, and controls an enlargement of the window according to the number of received ACKs. For example, referring to FIG. 1, the TCP sender receives a new ACK that is carried in a TCP packet with a sequence number of 9. Therefore, the TCP sender moves the sending window rightwards for one data packet, i.e., to the position of a packet No. 10 according to the sequence number of the TCP packet carried in the received ACK, and meanwhile enlarges the sending window by a size of one data packet, i.e., to the position of a packet No. 11 according to the number of received ACKs.

Currently, to better ensure the reliability of data transmission, various TCP optimization solutions are provided, for example, I-TCP algorithm, SNOOP, and WTCP, all of which adapt a line link and a radio link by setting a TCP proxy between a TCP sender and a TCP receiver, as shown in FIG. 2.

In the I-TCP algorithm, the TCP proxy divides a TCP connection into two sections: a line link and a radio link. Accordingly, the TCP proxy is capable of obtaining data packets from a server (i.e., the TCP sender) via the line link in advance and buffers the obtained data packets in the TCP proxy. After receiving the data packets, the TCP proxy, in place of a terminal (i.e., the TCP receiver), returns an ACK in advance, and further controls the sending rate more quickly and flexibly according to the change of the radio link, to fully utilize the air interface transmission capability.

The TCP optimization solutions such as SNOOP and WTCP realize the local retransmission, timeout retransmission, and sending window mechanisms in the TCP proxy, to avoid and reduce the re-transmission at the TCP sender as much as possible, or use a time stamp to more precisely estimate a loop transmission delay, or re-transmit lost packets at a higher priority, or realize a more reasonable forwarding-rate-control algorithm in the TCP proxy to enhance and optimize the functions of the TCP proxy. Therefore, the performance of the TCP is improved.

Nevertheless, when the radio condition is deteriorated, the radio link is congested, and as the buffering capacity of the TCP proxy is limited, only part of the sent data packets can be buffered. Therefore, if the server sends too many data packets, the TCP proxy has to discard some data packets, and then the server enters congestion avoidance or slow-start state after discovering the packet loss. This affects the performance of the TCP. When the radio condition is improved, the transmission capability of the radio link is suddenly enhanced, and the TCP proxy quickly delivers the buffered data. As a result, no data in the buffer can be delivered, so that the channel is cleared and the TCP throughput is reduced.

Though the I-TCP algorithm can increase the TCP throughput, the data loss possibly occurs. This is because the data in the server is sent to the TCP proxy in advance, once a handover occurs, the data in the TCP proxy cannot be completely sent in time. Meanwhile, the server has already received the ACK returned by the TCP proxy and may not perform data re-transmission, so the transmission of the TCP turns out to become unreliable. If the data on an original TCP proxy is synchronized to a new TCP proxy during the handover, the handover process becomes complex, the handover delay is greatly increased, and what's worse, the TCP connection on an upper layer may even be disconnected.

The prior art has at least the following problem:
The TCP proxy is capable of controlling its downstream forward link rate, but incapable of controlling its upstream forward link rate. In other words, the TCP proxy cannot control the sending rate at the section from the server to the TCP proxy, and thus cannot ensure that enough data packets are buffered. Therefore, once the radio condition is improved, the radio bandwidth may not be effectively utilized since there are no buffered data packets, thereby resulting in a low efficient data transmission.

SUMMARY OF THE INVENTION

Embodiments of the present invention are directed to a data transmission control method and a data transmission device, which are applicable to achieve a reliable and highly efficient data transmission.

To solve the above technical problem, a data transmission control method is provided in an embodiment of the present invention. The method includes the following steps.

Data from a sender is received and buffered, and the buffered data is then forwarded to a receiver.

An acknowledgement (ACK) returned by the receiver is received, where the ACK indicates that the data is received.

The ACK returned by the receiver may be added or reduced according to a volume of data unsent in the buffer, and the processed ACK may be sent to the sender. Data sending rate of the sender is controlled through the number of the processed ACK.

A data transmission device is further provided in an embodiment of the present invention. The device includes a storage unit, a first sending unit, a receiving unit, a processing unit, and a second sending unit.

The storage unit is adapted to buffer data from a sender.

The first sending unit is adapted to send the data buffered in the storage unit to a receiver.

The receiving unit is adapted to receive an ACK returned by the receiver, where the ACK indicates that the data is received.

The processing unit is adapted to add or reduce the ACK received by the receiving unit according to a volume of data unsent in the storage unit.

The second sending unit is adapted to send the ACK processed by the processing unit to the sender.

Comparing with the prior art, the embodiments of the present invention have the following differences and efficacies:

Because the sender determines a size of the sending window according to the number of received ACKs, the ACK returned by the receiver to the sender is added or reduced according to the volume of data unsent in the buffer, to enable the size of the sending window of the sender to correspond to the capacity of the remaining space in the buffer. Therefore, if a relatively large space of the buffer remains available, the sender can deliver more data, and thus the data transmission efficiency is improved. Furthermore, in the embodiments of the present invention, it is not necessary to return an ACK to the sender in advance in replacement of the receiver. In this way, the data loss can be avoided during the handover of the receiver, for example, a terminal.

DETAILED DESCRIPTION OF THE EMBODIMENTS

In order to make objectives, technical solutions, and advantages of the present invention more comprehensible, a detailed description of the embodiments of the present invention is given below with reference to the accompanying drawings.

Figure 1:
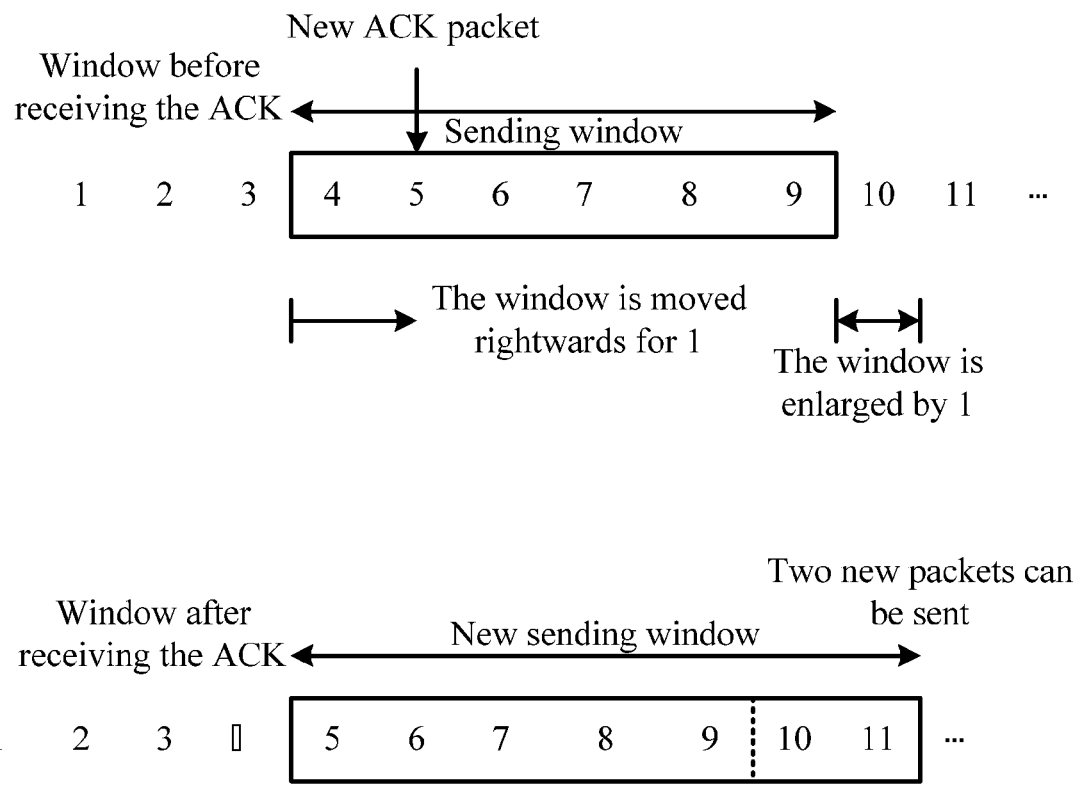
FIG. 1 is a schematic view of changes of a sending window in the prior art.
Figure 2:
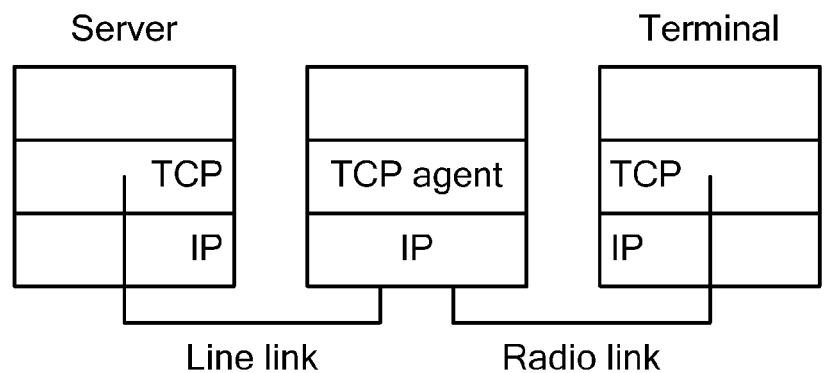
FIG. 2 is a schematic view of adapting a line link and a radio link via a TCP proxy in the prior art.
Figure 3:
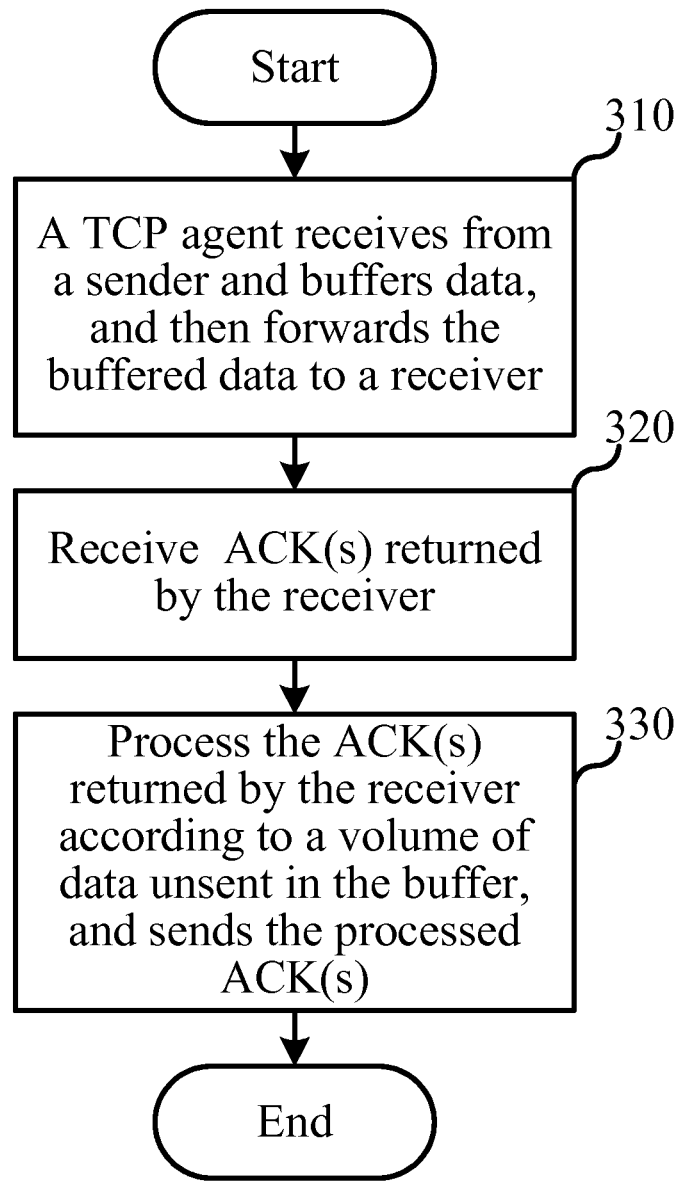
FIG. 3 is a flow chart of a data transmission control method according to a first embodiment of the present invention.

A data transmission control method is provided in one embodiment of the present invention. In this embodiment, a TCP proxy receives from a sender and buffers the data in a buffer, and then forwards the buffered data to a receiver. After receiving an ACK returned by the receiver, the TCP proxy adds or reduces ACKs returned by the receiver according to a volume of data unsent in the buffer, and then sends the processed ACK to the sender, to control a data sending rate of the sender through the number of sent ACK(s). The specific process is shown in FIG. 3.

In step 310, the TCP proxy receives from the sender and buffers the data in the buffer, and then forwards the buffered data to the receiver.

In step 320, the TCP proxy receives an ACK returned by the receiver. That is, the receiver receives the data forwarded by the TCP proxy, and then returns an ACK to the TCP proxy, where the ACK indicates that the receiver has successfully received the data from the sender.

In step 330, the TCP proxy processes the ACK(s) returned by the receiver according to a volume of data unsent in the buffer, and sends the processed ACK(s) to the sender.

Specifically, after receiving the ACK, the TCP proxy processes the received ACK(s) according to the volume of data unsent in the buffer. If the volume of data unsent in the buffer is larger than a first threshold, at least one ACK returned by the receiver is abandoned, and the remaining ACKs which are not abandoned are sent to the sender. If the volume of data unsent in the buffer is smaller than a second threshold, at least one ACK returned by the receiver is split into at least two ACKs. The sequence number of a data packet corresponding to one of the ACKs obtained through splitting remains the same, and the sequence numbers of data packets corresponding to the other ACKs are decreased in descending order. Then, the split ACKs are all sent to the sender. In addition, the second threshold is smaller than the first threshold. If the TCP proxy consecutively receives at least three identical ACKs, and the volume of data unsent in the buffer is smaller than a third threshold, any one or a few of the identical ACKs can be replicated, and then the ACKs obtained through replicating are all sent to the sender. If the TCP proxy has consecutively received at least three identical ACKs, and the volume of data unsent in the buffer is larger than a fourth threshold, the identical ACKs received subsequently are selectively abandoned. For example, one ACK is abandoned when two or more identical ACKs are received, and the remaining ACKs which are not abandoned are sent to the sender. In addition, the fourth threshold is larger than the third threshold. It should be noted that, the first threshold, the second threshold, the third threshold, and the fourth threshold are set by the TCP proxy according to the capacity of the buffer. If the volume of data unsent in the buffer does not satisfy any of the above conditions, the ACK is not processed and directly sent to the sender.

For example, if the volume of data unsent in the buffer is larger than the first threshold, it indicates that the bandwidth of a forward radio link is relatively narrow, so the data rate on a forward line link side needs to be controlled. The TCP proxy may abandon the ACKs returned by the receiver at a certain probability, and only send the ACKs which are not abandoned to the sender, so as to suitably reduce the number of the ACKs received by the sender The TCP proxy indirectly controls the size of the sending window to lower the data sending rate, and reduces the volume of data sent by the sender to an extent that is acceptable for the receiver, to prevent the buffered data from overflowing.

If the volume of data unsent in the buffer is smaller than the second threshold, it indicates that the radio link has a high transmission capability, so that the sender is required to rapidly send the data. The TCP proxy may split the ACK returned by the receiver to appropriately increase the number of ACKs received by the sender, and send all the ACKs obtained through splitting to the sender. For example, one ACK may be split into three ACKs. The sequence number of a data packet corresponding to one of the three ACKs obtained through splitting remains the same, and the sequence numbers of data packets corresponding to the other two ACKs are decreased in descending order. Accordingly, the ACK with a smaller sequence number is first transmitted to the sender, then the ACK with a larger sequence number is transmitted, and finally, the ACK with the largest sequence number is transmitted. Through splitting the ACK returned by the receiver, the number of ACKs is increased without causing a rapid retransmission by mistake. Moreover, the sending window of the sender is rapidly enlarged, the data transmission frequency is raised, and the volume of buffered data is increased, so as to avoid the circumstance that the data sending rate is reduced since no data is left in the buffer.

If the TCP proxy has consecutively received at least three identical ACKs, it indicates that the sender is about to enter a rapid retransmission and congestion avoidance stage, then the sending window of the sender may be reduced, which is probably reduced to a half plus three packet segments. As the sending window is reduced, the sender is unable to send new data packets, so the data sending rate is lowered, and the channel may be cleared. In this case, the TCP proxy needs to deal with the situation according to the conditions of the buffer area. If the volume of data unsent in the buffer is smaller than the third threshold, it indicates that the remaining space in the buffer area is large enough. Therefore, the TCP proxy can replicate a certain number of ACKs, and then sends all the ACKs to the sender, so as to rapidly enlarge the sending window, resume sending the retransmitted packets and new packets, and ensure the data sending rate without causing rapid retransmission of other data packets, thus safely and effectively improving the transmission efficiency. If the volume of data unsent in the buffer is larger than the fourth threshold, it indicates that the remaining space in the buffer area is not enough, and thus the TCP proxy selectively abandons a part or all of the repeated ACKs received subsequently, so as to reduce the number of the ACKs received by the sender, control the enlargement of the sending window, and prevent the buffered data from overflowing.

Therefore, it can be seen, as the sender determines a size of the sending window according to the number of received ACKs, the ACK returned by the receiver to the sender is added or reduced according to the volume of data unsent in the buffer, so as to enable the size of the sending window of the sender to correspond to the capacity of the remaining space in the buffer. Therefore, if a relatively large space of the buffer remains to be available, the sender can deliver more data, and the data transmission efficiency is improved. Furthermore, in the embodiment of the present invention, it is not necessary to return an ACK to the sender in replacement of the receiver in advance, so the data loss during the handover of the receiver (for example, a terminal) is avoided.

It should be noted that, in this embodiment, it is the TCP proxy that adds or reduces the ACK returned by the receiver according to the volume of data unsent in the buffer, then the sender is a network-side server, and the receiver is a terminal; alternatively, the sender is a terminal, and the receiver is a network-side server.

A data transmission control method is also provided in another embodiment of the present invention. This embodiment is similar to the above embodiment, and the difference there-between is described as follows. In the above embodiment, the TCP proxy adds or reduces the ACK returned by the receiver according to the volume of data unsent in the buffer. However, in this embodiment, the sender is a network-side server, and the receiver and the one adapted to add or reduce the ACK returned by the receiver according to the volume of data unsent in the buffer are different modules in a terminal; alternatively, the sender is a terminal, and the receiver and the unit adapted to add or reduce the ACK returned by the receiver according to the volume of data unsent in the buffer are different modules in a network server.

Therefore, the above entity for processing the ACK is not limited to an intermediate node (for example, the TCP proxy) in the TCP connection, but may be any TCP receiver, as long as it can control and process the ACK.

As the sender and the receiver may have different combinations, and any TCP receiver or intermediate node of the TCP connection may be adapted to add or reduce the ACK returned by the receiver according to the volume of data unsent in the buffer, the embodiment of the present invention can be implemented flexibly.

Figure 4:
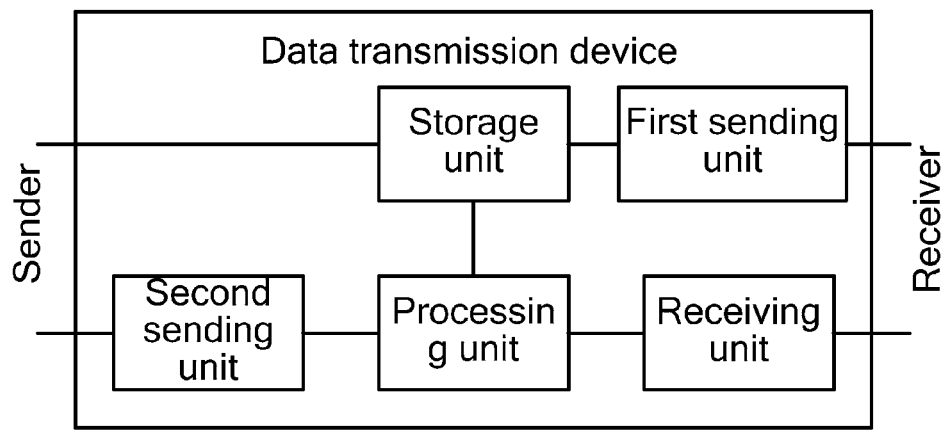
FIG. 4 is a structural view of a data transmission device according to a third embodiment of the present invention.

A data transmission device is provided in another embodiment of the present invention. Referring to FIG. 4, the device includes a storage unit, a first sending unit, a receiving unit, a processing unit, and a second sending unit. The storage unit is adapted to buffer data from a sender. The first sending unit is adapted to send the data buffered in the storage unit to a receiver. The receiving unit is adapted to receive an ACK indicating that the data has been received returned by the receiver. The processing unit is adapted to add or reduce the ACK received by the receiving unit according to a volume of data unsent in the storage unit. The second sending unit is adapted to send the ACK processed by the processing unit to the sender, so as to control a data sending rate of the sender through the processed ACK.

In view of the above, the ACK returned by the receiver to the sender is added or reduced according to the volume of data unsent in the buffer, so as to enable the size of the sending window of the sender to correspond to the capacity of the remaining space in the buffer. Therefore, if a large space of the buffer remains to be available, the sender can deliver more data, and the data transmission efficiency is improved. Furthermore, in the embodiment of the present invention, it is not necessary to return an ACK to the sender in replacement of the receiver in advance, so the data loss during the handover of the receiver is avoided, for example, a terminal.

Figure 5:
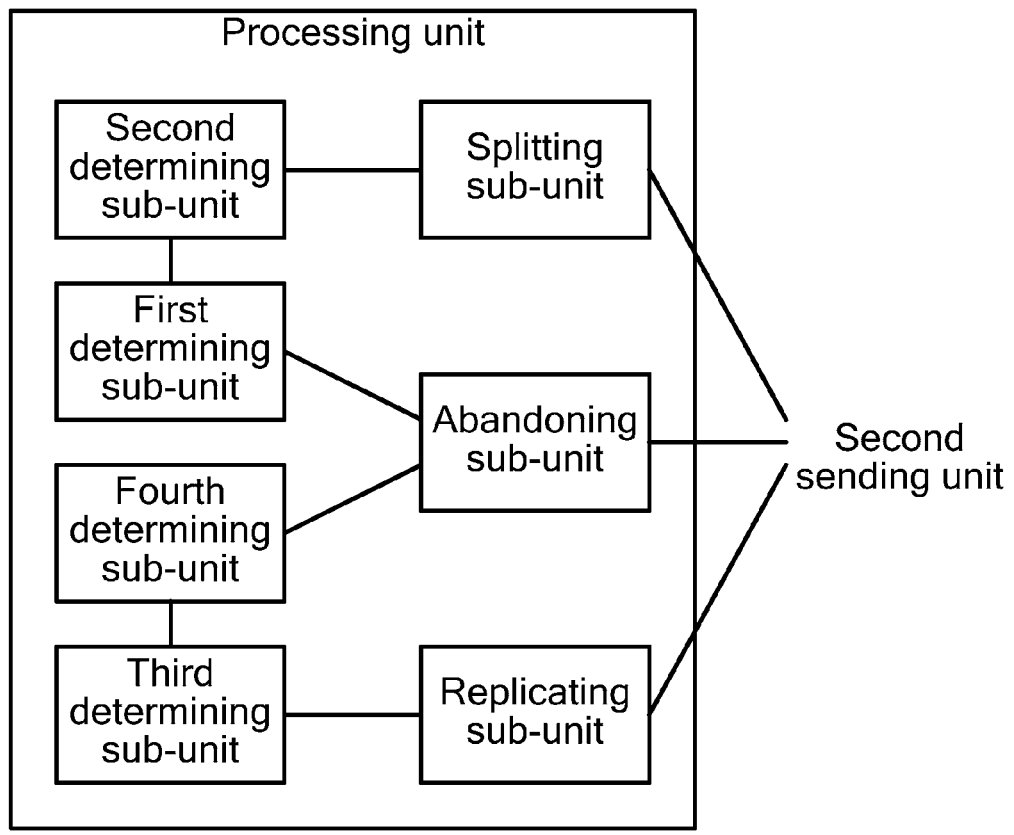
FIG. 5 is a schematic view of a processing unit in the data transmission device according to the third embodiment of the present invention.

Referring to FIG. 5, the processing unit of the data transmission device further includes an abandoning sub-unit and a first determining sub-unit. The abandoning sub-unit is adapted to abandon the ACK. The first determining sub-unit is adapted to determine whether the volume of data unsent in the storage unit is larger than a first threshold or not, and if the volume of data unsent in the storage unit is larger than the first threshold, the first determining sub-unit instructs the abandoning sub-unit to abandon at least one ACK received by the receiving unit. Thus, the number of the ACKs received by the sender is properly reduced to indirectly control the size of the sending window, so as to lower the data sending rate and reduce the volume of data sent by the sender to a range that is acceptable by the receiver, thus preventing the buffered data from overflowing. The second sending unit sends the ACKs that are not abandoned by the abandoning sub-unit to the sender.

The processing unit of the data transmission device may further include a splitting sub-unit and a second determining sub-unit. The splitting sub-unit is adapted to split the ACK. The second determining sub-unit is adapted to determine whether the volume of data unsent in the storage unit is smaller than a second threshold or not, and if the volume of data unsent in the storage unit is smaller than the second threshold, the second determining sub-unit instructs the splitting sub-unit to split at least one ACK received by the receiving unit into at least two ACKs. The sequence number of a data packet corresponding to one of the ACKs obtained through splitting remains the same, and the sequence number(s) of a data packet corresponding to the rest of the ACK(s) obtained through splitting are decreased in descending order. Through splitting the ACK returned by the receiver, the number of the ACKs is increased without causing a rapid retransmission by mistake. Moreover, the sending window of the sender is rapidly enlarged, the data transmission frequency is raised, and the volume of buffered data is increased, so as to avoid the circumstance that the data sending rate is reduced since no data is left in the buffer. Then, the splitting sub-unit sends all the ACKs obtained through splitting to the second sending unit, and the second sending unit further sends the ACKs to the sender.

The processing unit of the data transmission device may further include a replicating sub-unit and a third determining sub-unit. The replicating sub-unit is adapted to replicate the ACK. The third determining sub-unit is adapted to determine whether the receiving unit consecutively receives at least three identical ACKs, and whether the volume of data unsent in the storage unit is smaller than a third threshold or not. If the receiving unit consecutively receives at least three identical ACKs and the volume of data unsent in the storage unit is smaller than the third threshold, the third determining sub-unit instructs the replicating sub-unit to replicate at least one of the at least three ACKs. Due to the replication of the ACK, the sending window is enlarged, and the data sending rate is increased without causing rapid retransmission of other data packets, thus safely and effectively improving the transmission efficiency. Then, the replicating sub-unit sends all the ACKs obtained through replicating to the second sending unit, and the second sending unit further sends the ACKs to the sender.

The processing unit of the data transmission device further includes a fourth determining sub-unit. The fourth determining sub-unit is adapted to determine whether the receiving unit has consecutively received at least three identical ACKs, and whether the volume of data unsent in the storage unit is larger than a fourth threshold or not. If the receiving unit consecutively receives at least three identical ACKs and the volume of data unsent in the storage unit is larger than the fourth threshold, the fourth determining sub-unit instructs the abandoning sub-unit to selectively abandon the identical ACKs subsequently received by the receiving unit, so as to reduce the number of the ACKs received by the sender, control the enlargement of the sending window, and prevent the buffered data from overflowing. Then, the second sending unit sends the ACKs that are not abandoned by the abandoning sub-unit to the sender.

The data transmission device may be a TCP proxy or a unit in the TCP proxy or a network-side server or a unit in the network-side server or a terminal or a unit in the terminal, so that the embodiment of the present invention can be implemented flexibly.

Furthermore, it should be noted that, the units in this embodiment are all logic units, and various physical implementation manners can be adopted in practice.

From the foregoing, in the embodiment of the present invention, as the sender determines a size of the sending window according to the number of the received ACK, the ACK returned by the receiver to the sender is added or reduced according to the volume of data unsent in the buffer to enable the size of the sending window of the sender to correspond to the capacity of the remaining space in the buffer. Therefore, if a relatively large space of the buffer remains to be available, the sender can deliver more data, and the data transmission efficiency is improved. Furthermore, in the embodiments of the present invention, it is not necessary to return an ACK to the sender in replacement of the receiver in advance. In this way, the data loss during the handover of the receiver (for example, a terminal) is avoided.

If the volume of data unsent in the buffer is larger than the first threshold, at least one ACK returned by the receiver is abandoned, so as to reduce the number of the ACKs received by the sender, control the enlargement of the sending window, and reduce the volume of data sent by the sender to a range that is acceptable for the receiver, thus preventing the buffered data from overflowing.

If the volume of data unsent in the buffer is smaller than the second threshold, at least one ACK returned by the receiver is split into at least two ACKs, so as to increase the number of the ACKs received by the sender, enlarge the sending window of the sender, raise the data transmission frequency, and increase the volume of buffered data, so as to avoid the circumstance that the data sending rate is reduced since no data is left in the buffer.

Among the ACKs obtained through splitting, the sequence number of a data packet corresponding to one of the ACKs remains the same, and the sequence numbers of data packets corresponding to the rest of the ACKs obtained through splitting are decreased in descending order, so the number of the ACKs is increased without causing a rapid retransmission by mistake.

If at least three identical ACKs are consecutively received, i.e., data packets corresponding to the at least three ACKs are the same, and the volume of data unsent in the buffer is smaller than the third threshold, then at least one of the at least three ACKs is replicated. As three or more than three identical ACKs may cause the sender to perform a rapid retransmission, the sending window is greatly reduced, the data sending rate is lowered, and the channel may be cleared. Therefore, through the replication of the ACK, the sending window is enlarged, and the data sending rate is increased without causing the rapid retransmission of other data packets, thus safely and effectively improving the transmission efficiency.

If at least three identical ACKs are consecutively received, and the volume of data unsent in the buffer is larger than the fourth threshold, the identical ACKs received subsequently are selectively abandoned, so as to reduce the number of the ACKs received by the sender, control the enlargement of the sending window, and prevent the buffered data from overflowing.

Through the above descriptions of the embodiments, those skilled in the art may appreciate that the present invention can be accomplished by hardware or can be accomplished by software together with a necessary universal hardware platform. Therefore, the above technical solutions of the present invention can be substantially embodied in the form of a software product. The software product may be stored in a non-volatile storage medium such as a CD-ROM, a USB disk, or a portable hard disk, and further contain several instructions to instruct computer equipment (for example, personal computer, server, or network equipment) to execute the method as described in the embodiments of the present invention.

The above embodiments are merely some embodiments of the present invention, which are not intended to limit the protection scope of the present invention. It is apparent to those skilled in the art that various modifications and variations can be made to the structure of the present invention without departing from the scope of the invention. In view of the foregoing, it is intended that the present invention cover modifications and variations of this invention provided they fall within the scope of the following claims and their equivalents.

What is claimed is:
1. A method for controlling data transmission comprising:
receiving, by a transmission device, data from a sender;
buffering, by the transmission device, the received data;
sending, by the transmission device, a volume of the buffered data to a receiver;

receiving, by the transmission device, a quantity of acknowledgements (ACKs) from the receiver (receiver ACKs) in accordance with the volume of sent buffered data successfully received by the receiver, the quantity of ACKS including one or more ACKs;

increasing, by the transmission device, the quantity of the receiver ACKs in accordance with a volume of unsent buffered data remaining in the transmission device; and sending, by the transmission device, the increased quantity of the receiver ACKs to the sender to control a data sending rate of the sender;

wherein the increasing by the transmission device, if the volume of the unsent buffered data is smaller than a threshold, comprises: splitting at least one of the quantity of receiver ACKs into at least two ACKs, and renumbering sequence numbers of data packets corresponding to the increased quantity of receiver ACKs by allowing a first sequence number of a first data packet of a first ACK of the at least two ACKs resulting from the splitting, and decreasing remaining sequence numbers of data packets corresponding to remaining ACKs in the increased quantity of receiving ACKs in descending order from the first sequence number.

2. The method for controlling data transmission according to claim 1,
wherein:
the data is transmission control protocol (TCP) data;
the sender is a network-side server;
the receiver is a terminal; and
the transmission device is a TCP proxy.

3. The method for controlling data transmission according to claim 1, wherein:
the data is TCP data,
the sender is a terminal,
the receiver is a network server, and
the transmission device is a TCP proxy.

4. The method for controlling data transmission according to claim 1, wherein:
the data is TCP data,
the sender is a network-side server, and
the receiver and the transmission device are different modules in a terminal.

5. The method for controlling data transmission according to claim 1, wherein:
the data is TCP data,
the sender is a terminal, and
the receiver and the transmission device are different modules in a network server.

6. A data transmission device comprising:
a data buffer;
a transceiver communicatively connected to the data buffer; and
a processor communicatively connected to the transceiver and the data buffer;
wherein the transceiver is configured to receive data from a sender;
wherein the data buffer is configured to buffer the received data, and the transceiver is further configured to send a volume of the buffered data to a receiver and receive a quantity of one or more acknowledgements (ACKs) from the receiver (receiver ACKs) in accordance with the volume of sent buffered data successfully received by the receiver, wherein the processor is configured to increase the quantity of the receiver ACKs in accordance with a volume of unsent buffered data remaining in the transmission device, and the transceiver is further configured to send the increased quantity of the receiver ACKs to the sender to control a data sending rate of the sender, and wherein the processor is further configured to increase the quantity of the receiver ACKs if the volume of the unsent buffered data is smaller than a threshold by: splitting at least one of the quantity of receiver ACKs into at least two ACKs if the volume of the unsent buffered data is smaller than a threshold, and renumbering sequence numbers of data packets corresponding to the increased quantity of receiver ACKs by allowing a first sequence number of a first data packet of a first ACK of the at least two ACKs resulting from the splitting, and decreasing remaining sequence numbers of data packets corresponding to remaining ACKs in the increased quantity of receiving ACKs in descending order from the first sequence number.

7. The data transmission device according to claim 6, wherein data transmission device is one of: a transmission control protocol (TCP) proxy, a unit in the TCP proxy, a network-side server, a unit in the network-side server, a terminal, and a unit in the terminal.

8. A system for controlling data transmission comprising: a data transmission device configured to receive data from a sender, to buffer the received data, to send a volume of the buffered data to a receiver, to receive a quantity of one or more acknowledgements (ACKs) from the receiver in accordance with the volume of sent buffered data successfully received by the receiver, to increase the quantity of the receiver ACKs in accordance with a volume of unsent buffered data remaining in the transmission device, and to send the increased quantity of the receiver ACKs to the sender to control a data sending rate of the sender, wherein the data transmission device is configured to increase the quantity of the receiver ACKs if the volume of the unsent buffered data is smaller than a threshold by splitting at least one of the quantity of receiver ACKs into at least two ACKs, and renumbering sequence numbers of data packets corresponding to the increased quantity of receiver ACKs by allowing a first sequence number of a first data packet of a first ACK of the at least two ACKs resulting from the splitting, and decrease remaining sequence numbers of data packets corresponding to remaining ACKs in the increased quantity of receiving ACKs in descending order from the first sequence number.

9. The system according to claim 8, wherein the data transmission device is one of a transmission control protocol (TCP) proxy, a unit in the TCP proxy, a network-side server, a unit in the network-side server, a terminal, and a unit in the terminal.

* * * * *